United States Patent [19]
Morse et al.

[11] Patent Number: 5,606,723
[45] Date of Patent: Feb. 25, 1997

[54] APPARATUS FOR DELIVERING ELECTROMAGNETIC ENERGY INTO A SOLUTION

[75] Inventors: Dwain E. Morse; James H. Cook, both of Santa Barbara; Thomas G. Matherly, Lompoc; Howard M. Ham, Jr., Santa Ynes, all of Calif.

[73] Assignee: ZPM, Inc., Goleta, Calif.

[21] Appl. No.: 378,462

[22] Filed: Jan. 25, 1995

[51] Int. Cl.[6] .................................... B01J 19/12
[52] U.S. Cl. ............... 422/186; 422/186.01; 422/186.29; 422/906
[58] Field of Search ............... 422/186, 186.01, 422/186.29, 906

[56] References Cited

U.S. PATENT DOCUMENTS

| | | | |
|---|---|---|---|
| 4,865,747 | 9/1989 | Larson et al. | 210/695 |
| 5,236,670 | 8/1993 | Iwata | 422/186.04 |
| 5,407,639 | 4/1995 | Watanabe et al. | 422/186.07 |

*Primary Examiner*—Donald P. Walsh
*Assistant Examiner*—Daniel Jenkins
*Attorney, Agent, or Firm*—Freilich Hornbaker Rosen

[57] ABSTRACT

An apparatus for delivering RF-modulated electromagnetic energy into a solution for modifying its characteristics. Characteristic of the delivery apparatus is the use of a coil and a voltage probe in a fluid electrically isolated from the solution to deliver the electromagnetic field. Embodiments of the present invention preferably control the magnitude and duty cycle of the electromagnetic energy and further preferably distribute a plurality of delivery apparatus according to the energy distribution of a selected delivery apparatus.

25 Claims, 14 Drawing Sheets

APPARATUS FOR DELIVERING ELECTROMAGNETIC ENERGY INTO A SOLUTION

BACKGROUND OF THE INVENTION

The present invention relates to an apparatus for delivering electromagnetic energy into a colloidal suspension, i.e., a solution, for the purpose of modifying its characteristics.

Various systems are known for treating water or other solutions by introducing electric or magnetic energy. For example only, see U.S. Pat. Nos. 4,865,747; 4,865,748; 4,963,268; 5,036,170; 5,074,998; 5,113,751; 5,139,675; 5,171,431; 5,173,169; 5,183,512; 5,183,565; 5,217,607; 5,230,807; 5,236,670; 5,304,289; 5,306,887; 5,320,726; and 5,326,446.

It has been reported that "Zeta potential can help you understand and control colloidal suspensions. Examples include complex biological systems such as blood and functional ones like paint. Colloidal suspensions can be as thick as paste (like cement) or as dilute as the turbidity particles in a lake. Water, milk, wine, clay, dyes, inks, paper and pharmaceuticals are good examples of useful colloidal systems. Water is a common suspending liquid, although non-aqueous liquids are used as well. In many cases, the performance of a suspension can be improved by understanding the effect of colloidal behavior on such properties as viscosity, settling and effective particle size." See: "Zeta Potential: A Complete Course in 5 Minutes", Zeta Meter, Inc which is incorporated herein by reference.

SUMMARY OF THE INVENTION

The present invention is directed to an apparatus for the delivery of RF-modulated electromagnetic energy, i.e., magnetic and electric fields, into a solution for modifying the characteristics of the solution.

Preferred embodiments of delivery apparatus in accordance with the invention are comprised of 1) a housing having closed ends and forming a water-tight chamber, 2) a coil contained within the chamber delivering a magnetic field into a solution, 3) at least one electric field probe coupled to the coil for delivering an electric field into the solution, and 4) coupling means for coupling an electromagnetic signal to the coil.

In a preferred embodiment, the electric field probe (hereinafter, the "voltage" probe) is contained within a chamber containing a fluid electrically isolated from the solution. A signal generator coupled to the coil is used to energize the delivery apparatus for producing the magnetic and electric fields. The signal generator is preferably configured to adjust the amplitude and duty cycle of the energizing signal.

A delivery apparatus in accordance with the invention, is typically used in proximity to a solution whose characteristics, as indicated by its zeta potential or any other appropriate measure of the modified characteristics of the solution, can be modified by applied RF-modulated electromagnetic energy. In accordance with one aspect of the invention, the applied electromagnetic energy is controlled, i.e., power level, duration and duty cycle to optimize solution treatment. Moreover, the distribution of delivery apparatus units within the solution is also selected to optimize solution treatment.

The novel features of the invention are set forth with particularity in the appended claims. The invention will be best understood from the following description when read in conjunction with the accompanying drawings.

DESCRIPTION OF THE PREFERRED EMBODIMENTS

The present invention relates to an apparatus for delivering electromagnetic energy in the form of magnetic and electric fields into a colloidal suspension, i.e., a solution, for modifying its characteristics. The ability to modify a solution's characteristics, e.g., its zeta potential or any other appropriate measure, is improved when it is subjected to an RF-modulated magnetic field and an RF-modulated electric field. The present invention is directed to such a system for delivering RF-modulated electromagnetic energy into a solution.

Figure 1:
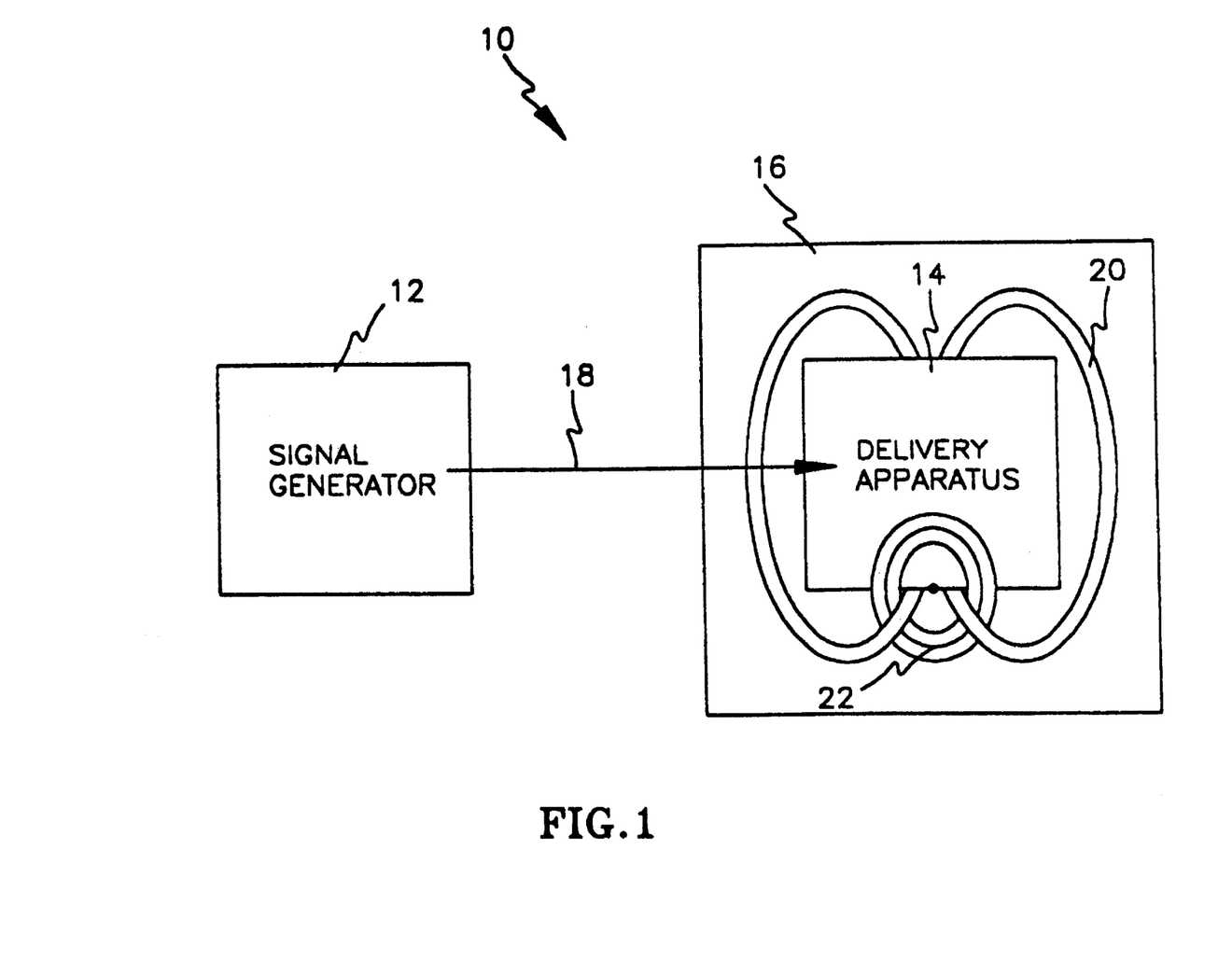
FIG. 1 comprises a block diagram of a preferred embodiment of a delivery system for delivering RF-modulated electromagnetic energy to a solution.
Figure 2:
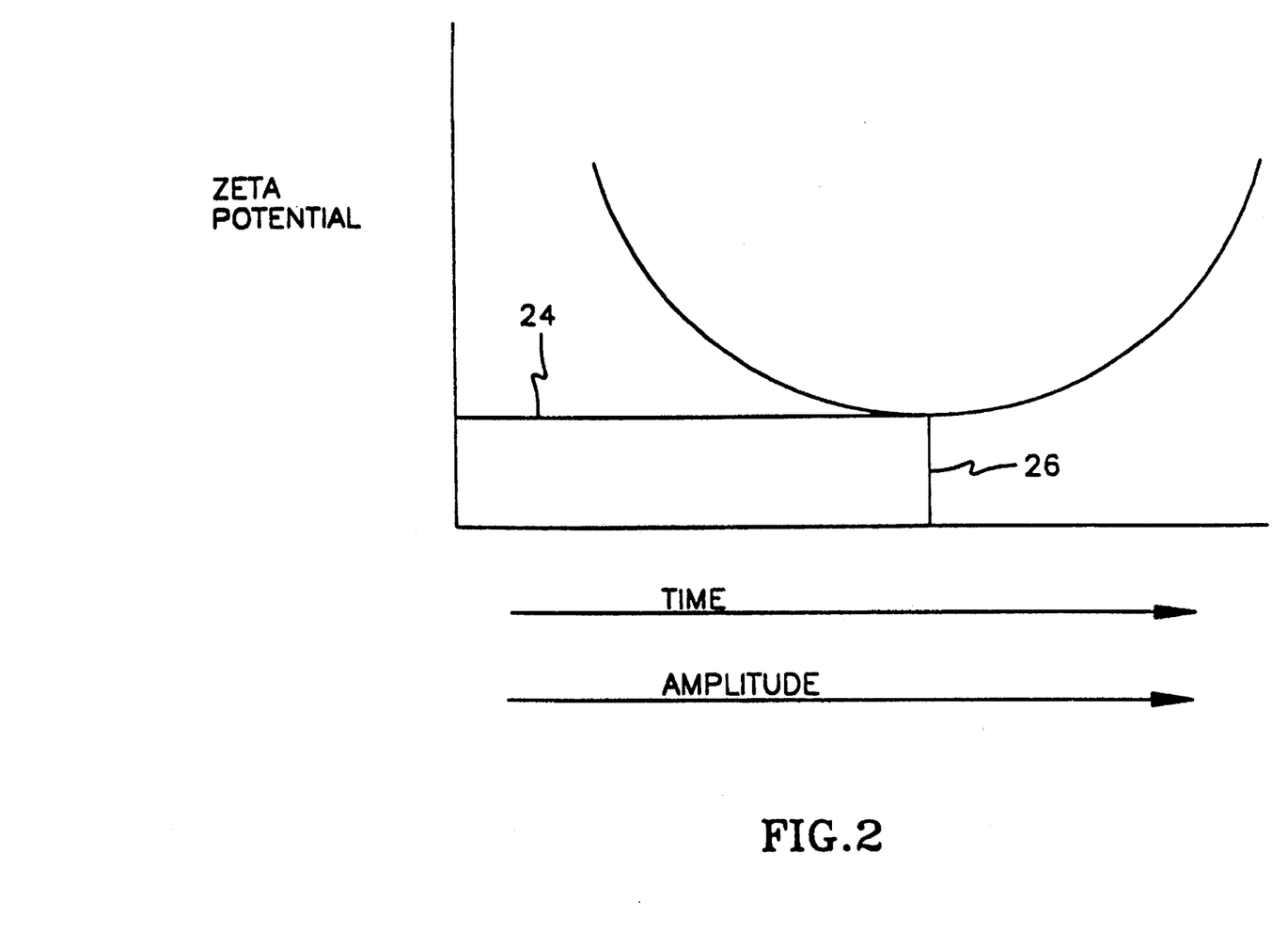
FIG. 2 is a graphical representation of how the zeta potential of a solution is modified as a function of the amplitude and duration of treatment with radio frequency (RF) electromagnetic energy.

FIG. 1 shows a block diagram of a delivery system 10, primarily comprised of a signal generator 12 and a delivery apparatus 14 contained within a solution 16. The signal generator 12 generates an RF-modulated signal 18 that drives the delivery apparatus 14. The delivery apparatus 14, when stimulated by the RF-modulated signal 18, generates a magnetic field 20 and an electric field 22. As shown in FIG. 2, some solution's characteristics, e.g., its zeta potential, alter as a function of the time duration and/or amplitude of the RF-modulated energy delivered into the solution. However, modification of the zeta potential of the solution in response to RF-modulated energy reaches a valley 24 and reverses when an energy level increases beyond an optimal treatment point 26, as a function of the time duration and/or amplitude of the RF-modulated energy delivered. The modification to the solution is believed to be time limited and thus decreases over time. Thus, preferred embodiments of the present invention apply RF-modulated energy for a first time period, remove the RF-modulated energy for a second time period and then repeat this application and removal pattern, defining a duty cycle. The duty cycle and the amplitude cooperatively determine the rate that power is delivered into the solution.

As with most electromagnetic energy, the intensity of energy measured from the delivery apparatus 14 varies with distance. Thus, to uniformly treat the solution 16, the distance from the delivery apparatus 14 and attributes of the RF-modulated signal 18 must be used in conjunction to select treatment parameters, e.g., time duration, duty cycle, amplitude, and distance, which determine a rate that power is applied to the majority of the solution and thus achieve the desired modification.

TABLE I

| Delivery Apparatus | D = 0 V (estimated) Atmosphere | D = 6 in. V Water | D = 1 Ft. V Water | D = 4 Ft. V Water | D = 6 Ft. V Water |
|---|---|---|---|---|---|
| DA I | 5000 | 12.0 | 6.0 | 2.0 | 1.0 |
| DA II | 10,000 | 25.0 | 18.0 | 12.0 | 8.0 |

Figure 3:
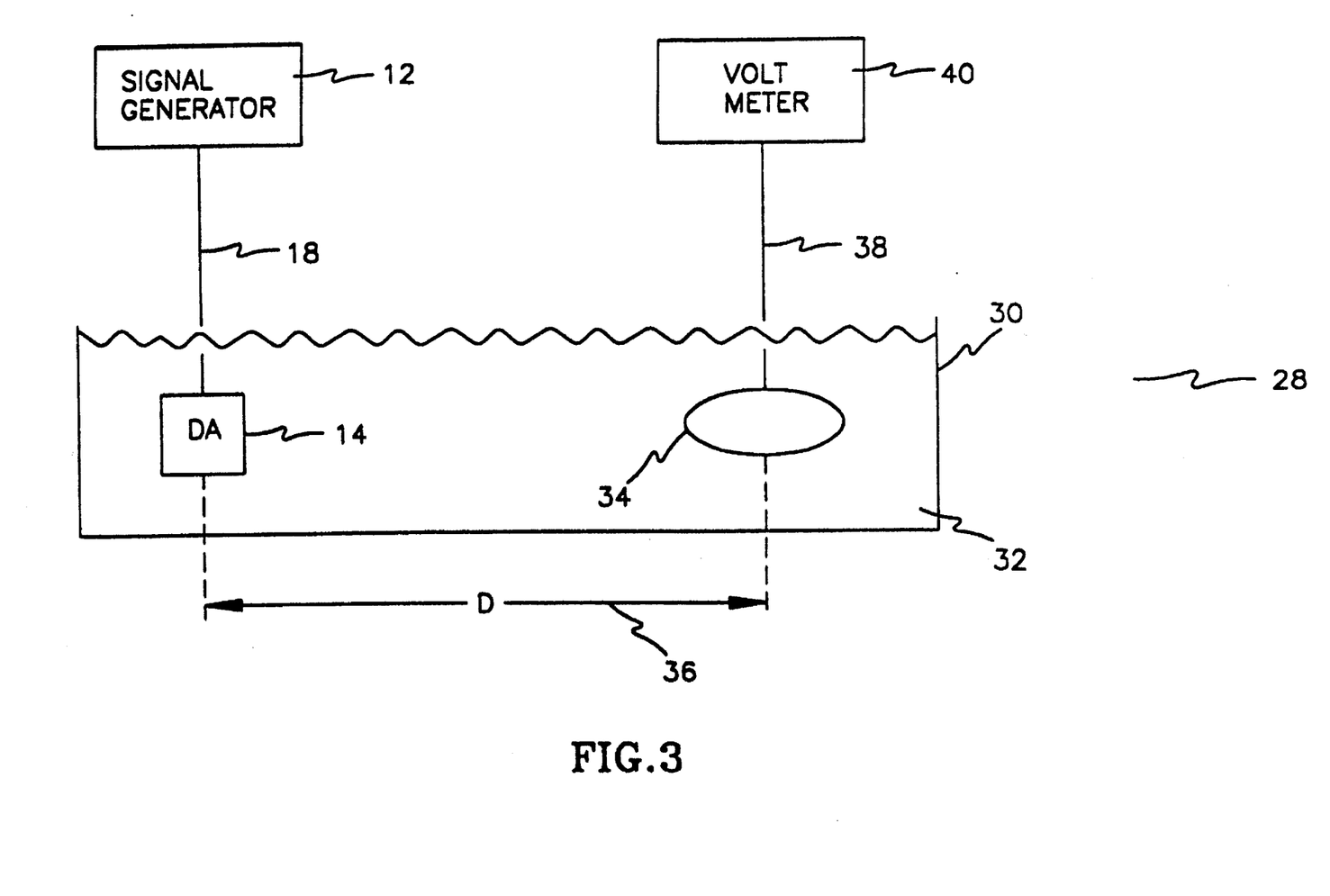
FIG. 3 is a block diagram of a test bed for determining treatment parameter settings.
Figure 4:
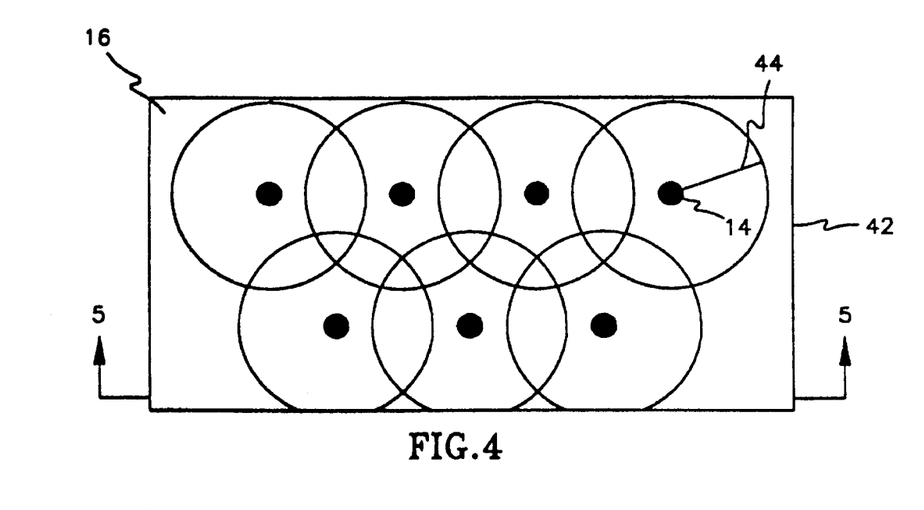
FIG. 4 comprises a top level view of a tank showing a distribution of delivery apparatus and associated RF electromagnetic energy distribution.
Figure 5:
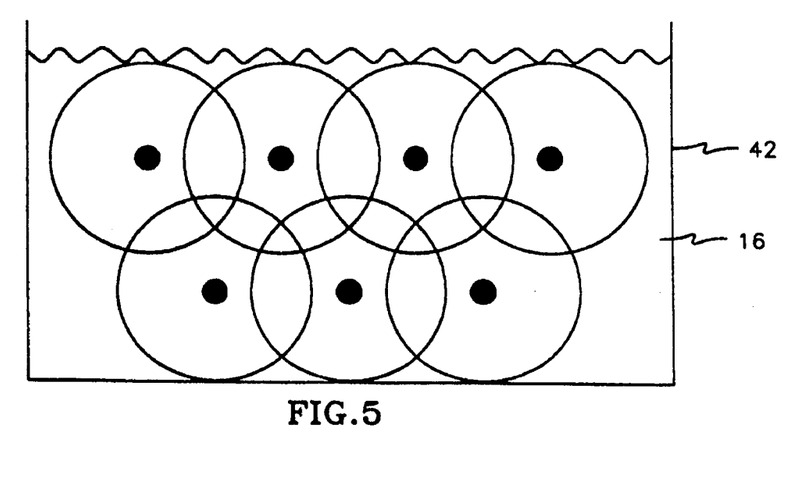
FIG. 5 comprises a side elevation view of the tank of FIG. 4 along the plane 5—5.

FIG. 3 shows a test bed 28 for determining the treatment parameters. The test bed 28 is comprised of a tank 30 that is filled with a test fluid 32 corresponding to the solution 16 that is to be treated. The delivery apparatus 14 is submerged within the fluid 32 and is driven by the signal generator 12 via the RF-modulated signal 18. A sensor 34, primarily comprised of a coil, is submerged within the fluid 32 a distance 36 away from the delivery apparatus 14. The sensor 34 is coupled via signal path 38 to a voltmeter 40 to measure the magnitude of RF energy coupled from the delivery apparatus 14 to the sensor 34 through the fluid 32. Voltages measured by the voltmeter 40 are believed to correspond to modifications of the fluid 32, e.g., its zeta potential. Using the test bed 28, measurements are taken to determine test data as listed above in Table I corresponding to various preferred embodiments of the delivery apparatus 14 (discussed further below). Accordingly, as shown in FIGS. 4 and 5, a plurality of delivery apparatus 14 are distributed in an actual treatment system tank 42 within a three dimensional matrix. By distributing the delivery apparatus 14 accordingly, radial arcs of treatment distance 44 containing a desired permissible range of RF energy can be positioned to encompass the majority of the solution 16 to be treated. Once the desired treatment distance 44 is chosen, the remaining treatment parameters, the time duration and amplitude of the RF-modulated signal 18, are interactively chosen according to the test data to achieve the desired modification to the solution.

Figure 6:
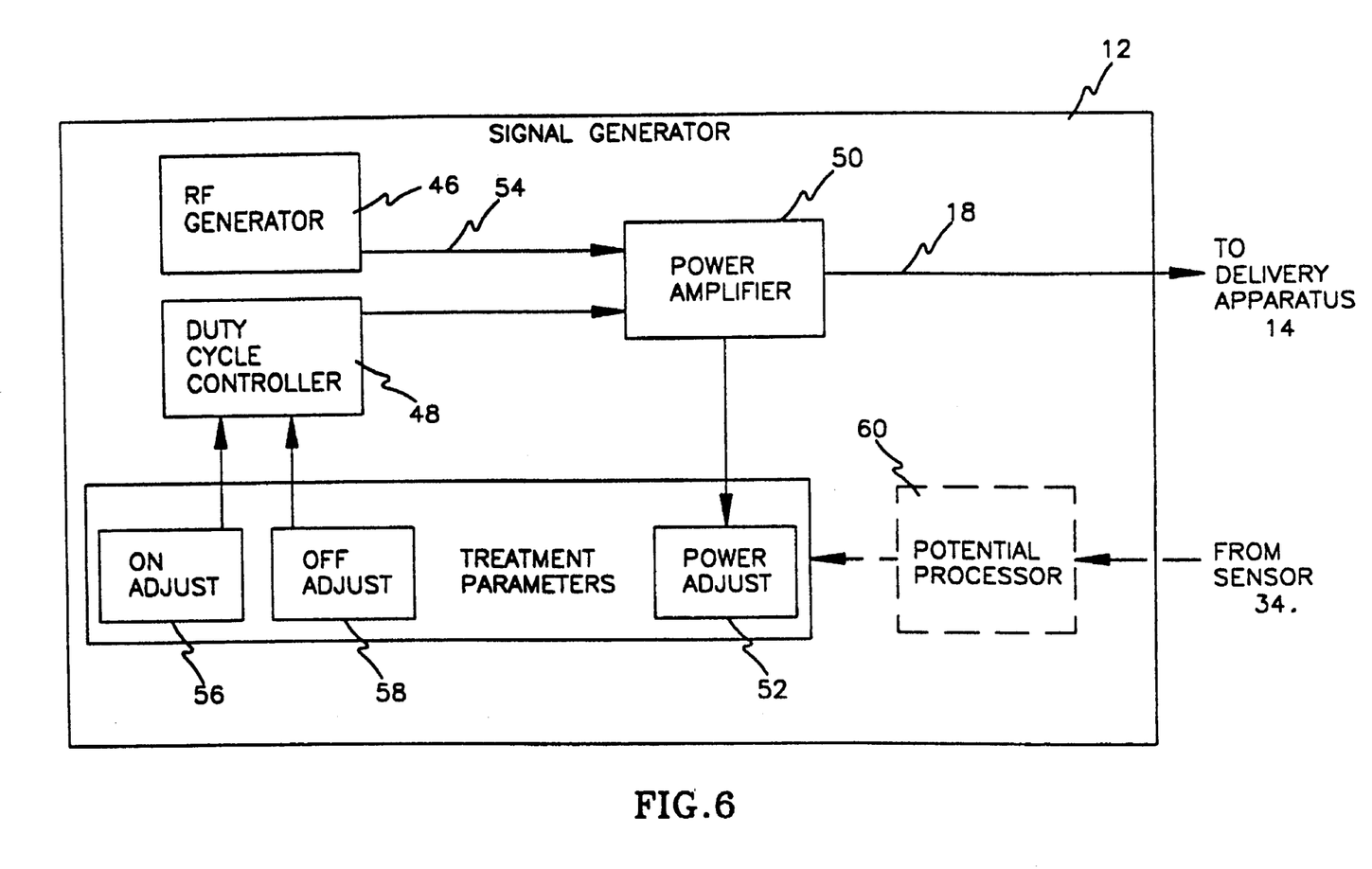
FIG. 6 is a block diagram of the signal generator of the preferred embodiment of FIG. 1.

FIG. 6 shows a block diagram of the signal generator 12, primarily comprised of an RF generator 46 which generates a fixed RF frequency, e.g., 27.225 MHz, a duty cycle controller 48 and a power amplifier 50. The power amplifier 50, under control of a power/amplitude adjustment 52, sets the amplitude of an RF signal 54 input from the RF generator 46 and outputs a fixed amplitude signal to the delivery apparatus 14 via the RF-modulated signal 18 according to the selected treatment parameters. The duty cycle controller 48 controls the power amplifier 50 by modulating its output on and off. The duty cycle controller 50 is set according to an on adjustment 56 and an off adjustment 58 to generate the duty cycle according to the selected treatment parameters. The on and off adjustments 56, 58 are preferably adjustable in increments, e.g., one minute, up to a duration of sixty minutes. Thus, a typical setting of ten minutes on and sixty minutes off can be accommodated.

Figure 7:
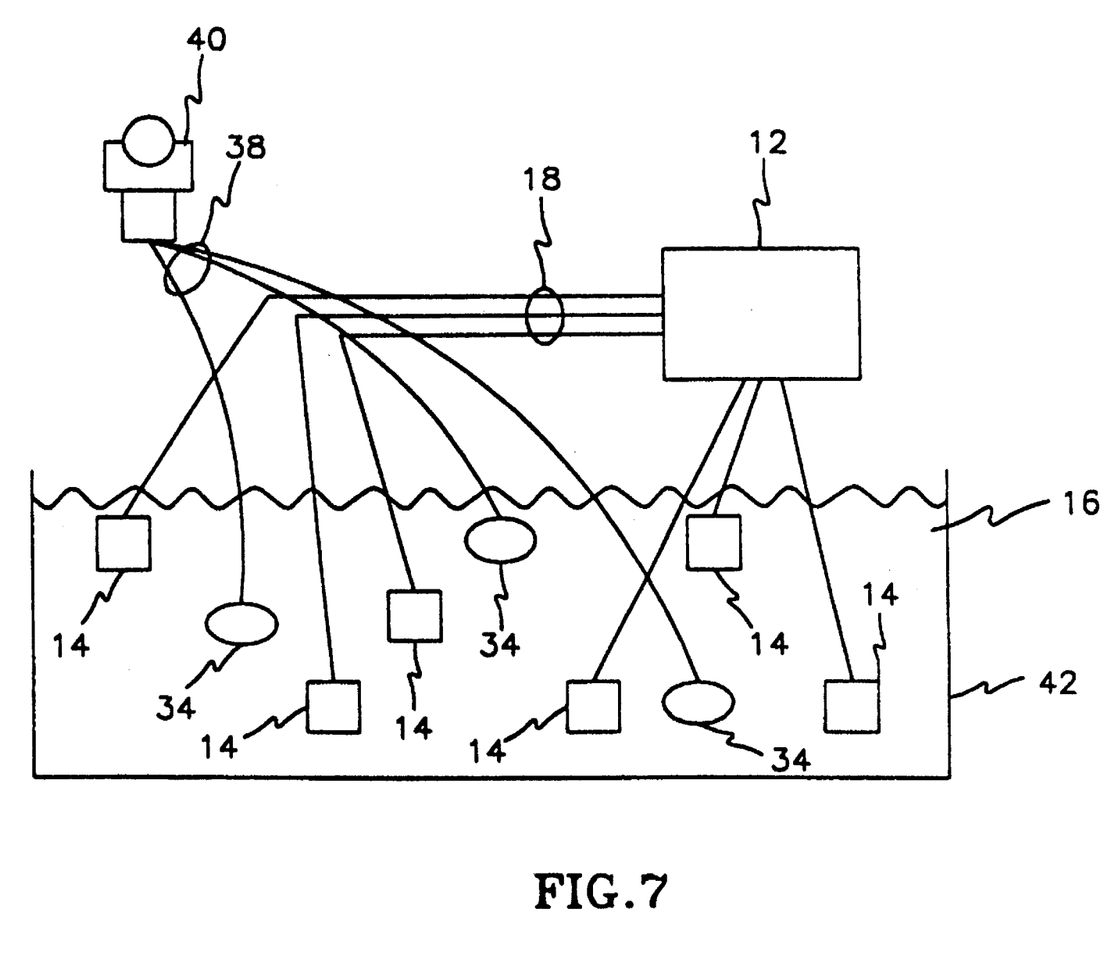
FIG. 7 is a side elevation view of a preferred distribution of distribution apparatus in a tank along with sensors for monitoring the effectiveness of the treatment parameters.

In a preferred embodiment, as shown in FIG. 7, a plurality of sensors 34 are present permitting confirmation of the efficacy of the settings of the treatment parameters in its actual environment. However, it is recognized, that sensors 34 only read voltages that are indicative of the effectiveness of the delivery system 10 which operates in an open loop manner. Thus, in an alternative embodiment, the sensors 34 are replaced by sensors that directly determine the modification to the solution, e.g., its zeta potential value. In this alternative embodiment, a potential processor 60 reads the achieved modification to the solution, e.g., its zeta potential, and accordingly modifies the duty cycle controller 48 and the power amplifier 50 by interactively determining preferred settings for the on adjustment 56, the off adjustment 58 and the power amplitude adjustment 52. Thus, closed loop control is achieved in this alternative embodiment.

Figure 8A:
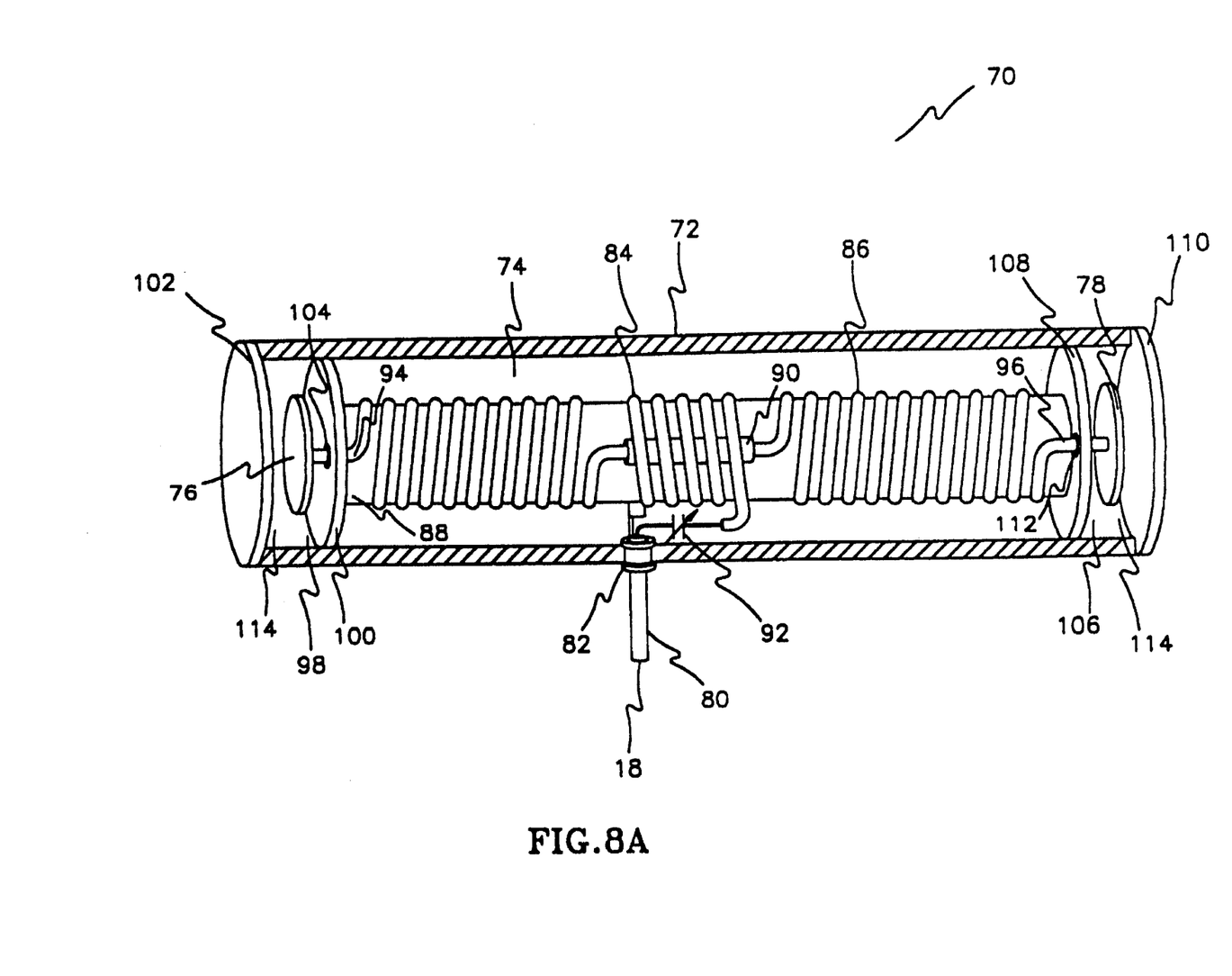
FIG. 8A is a transparent view of a first preferred embodiment of a delivery apparatus.
Figure 8B:
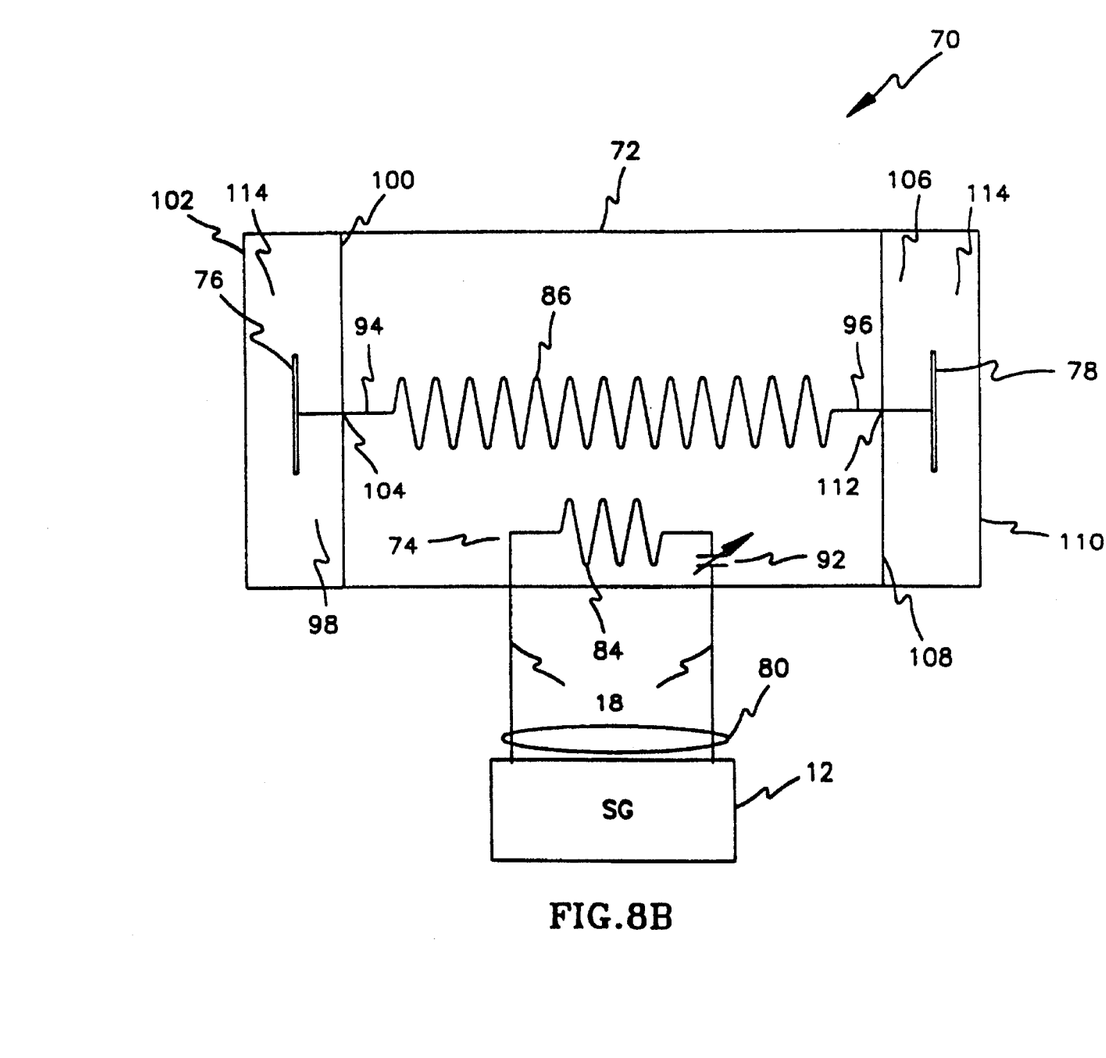
FIG. 8B is a schematic cross section of the embodiment of FIG. 8A.

As referenced above in the discussion of Table I, the effectiveness of the delivery system 10 is determined by the treatment parameters which are set according to the characteristics for selected delivery apparatus 14 in solution 16. A first preferred delivery apparatus 70, referenced in Table I as DA I, is shown in FIG. 8A. The delivery apparatus 70 is primarily comprised of 1) a water-tight housing 72, preferably cylindrical, 2) a transformer 74 contained within the housing, 3) first and second voltage probe discs 76 and 78 coupled to the transformer 74 and 4) a coaxial cable 80 coupled to the transformer 74 in the housing 72 through a first water-tight seal 82 and passing the RF-modulated signal 18 from the signal generator 12. As also shown in the schematic representation of FIG. 8B, the transformer 74 is comprised of a primary coil 84 inductively coupled to a secondary coil 86, and having voltage probe discs 76 and 78 coupled to the secondary coil 86, preferably at its ends. The primary and secondary coils 84 and 86 are wound around a tube 88 which is preferably formed of a non-conductive material, e.g., PVC. The primary coil 84 is preferably wound around a portion of the secondary coil 86, and is maintained in electrical isolation from the secondary coil 86 by an insulator 90 or alternatively by forming the coils from insulated conductors. The RF-modulated signal 18 is preferably coupled to the primary coil 84 through a high "Q" variable capacitor 92 which is set to a value to match the impedance of the delivery apparatus 70 to the signal generator 12. When the primary coil 84 is powered by the RF-modulated signal 18, magnetic field 20, also referred to as an H-field, is generated primarily from the secondary coil 86 and extending beyond the delivery apparatus 70 and into the solution 16. The secondary coil 86, as a consequence of inductive coupling to the primary coil 84, generates a voltage (measured between electrical ends 94 and 96) having an amplitude larger than the voltage presented to the primary coil 84 from the RF-modulated signal 18. The voltages from electrical ends 94, 96 are coupled to voltage probe discs 76 and 78, respectively. The voltage probe disc 76 is contained within a first non-conductive water-tight chamber 98 formed at a first end of the housing 72. A first non-conductive inner end plate 100 is sealed at a first inner position of the housing 72 and a first non-conductive thin outer end plate 102, proximate to the first end of the housing 72, is sealed at the first end of the housing 72 to form the chamber 98. The electrical end 94 of the secondary coil 86 is coupled to the voltage probe disc 76 through a second water-tight seal 104. Similarly, a second non-conductive water-tight chamber 106 is formed at the second end of the housing 72 between second inner end plate 108 and second outer end plate 110, having the second voltage probe disc 78 contained within and coupled via a third water-tight seal 112 in second inner end plate 108 to electrical end 96. The chambers 98, 106 are preferably filled with a fluid 114, e.g., de-ionized water (DI). Coupling the electric field 22 into the fluid-filled chambers 98, 106 and through thin outer end plates 102, 110 before coupling the electric field 22 to the solution 16 improves the delivery of the electric field 22 to the solution 16 and allows the apparatus 70 to be tuned outside of the solution 16. Also, by maintaining the voltage probe discs 76, 78 in electrical isolation from the solution 16, signal loading is reduced. Sections of the housing 72 which form the first and second water-tight chambers 98, 106 are preferably made from non-conductive materials, e.g., PVC. However, the wall section of housing 72 surrounding transformer 74, i.e., between inner end plates 100, 108 can alternatively be fabricated from non-conductive, e.g., PVC, or conductive materials, e.g., copper.

Figure 9A:
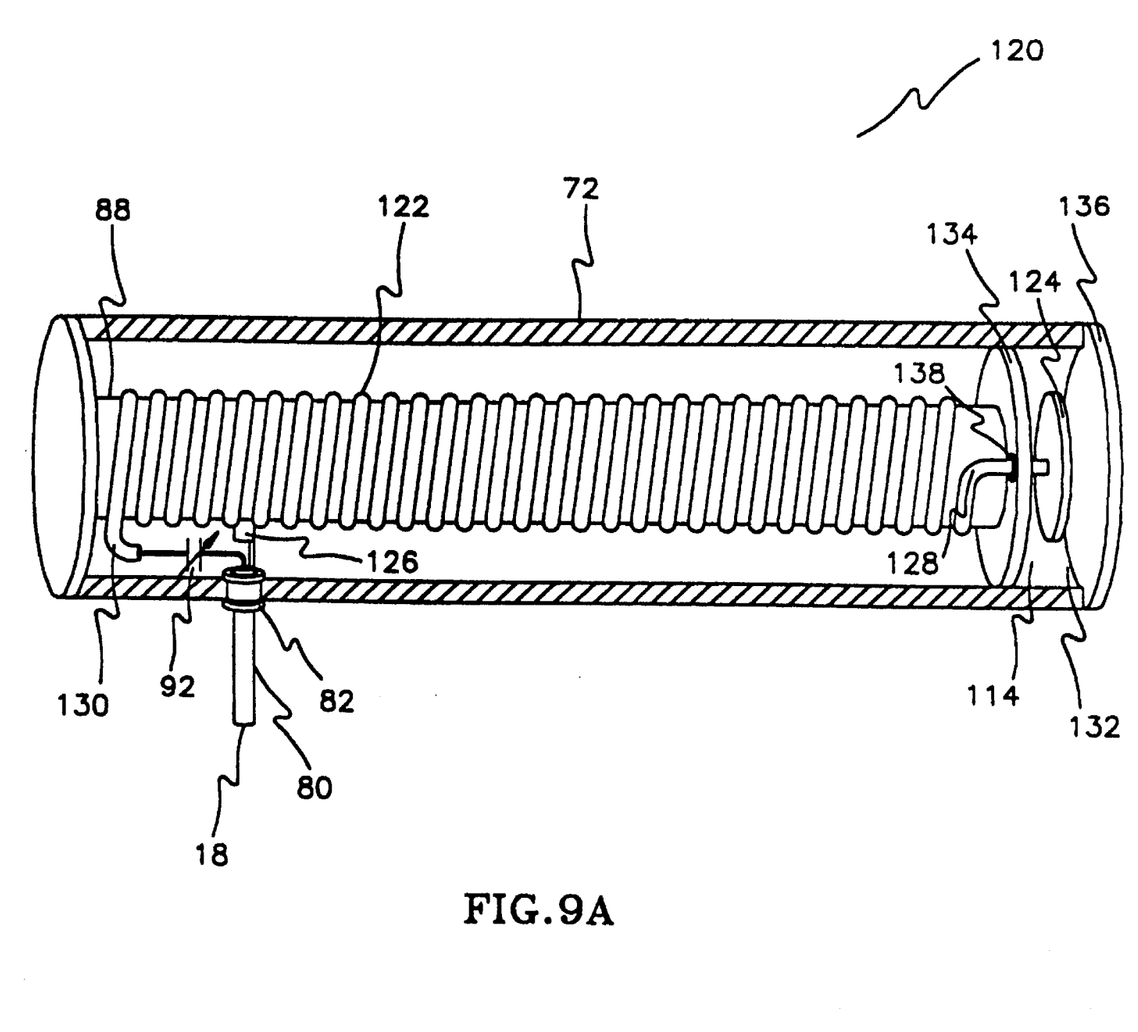
FIG. 9A is a transparent view of a second preferred embodiment of a delivery apparatus.
Figure 9B:
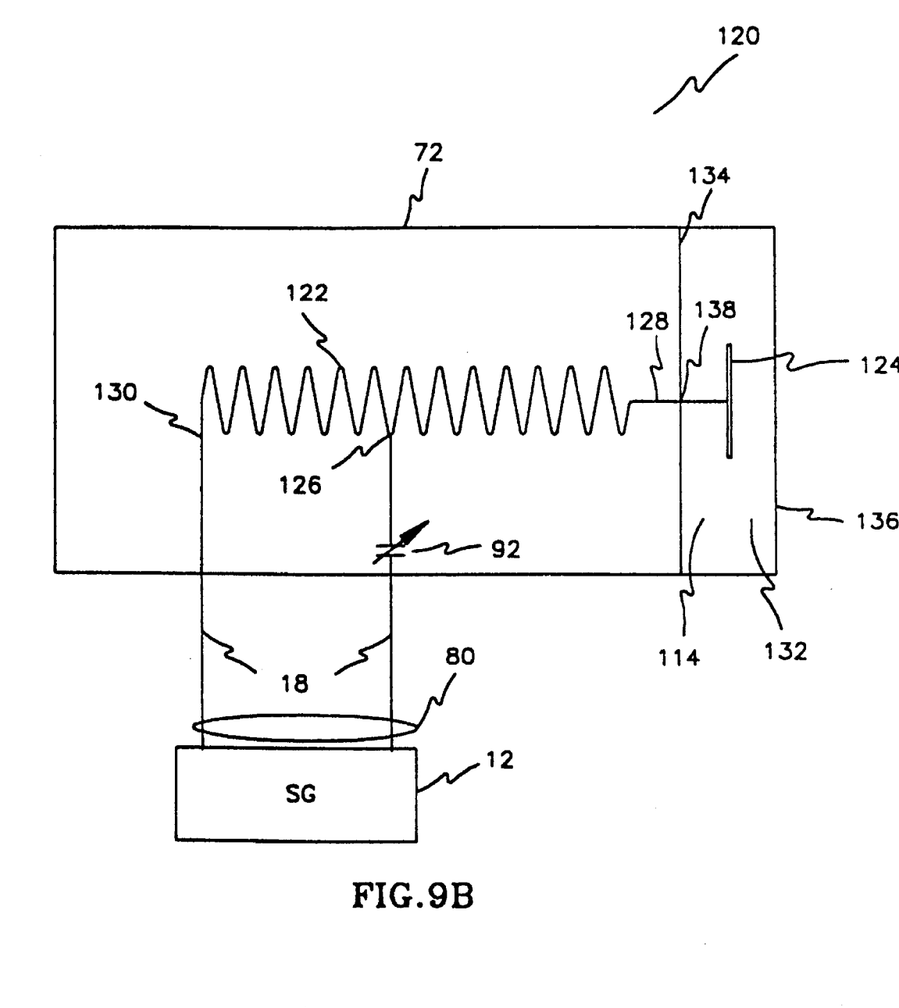
FIG. 9B is a schematic cross section of the embodiment of FIG. 9A.

FIGS. 9A and 9B show a second alternative embodiment 120 of the delivery apparatus 14, referred to as DA II in Table I. The delivery apparatus 120 is primarily comprised of 1) water-tight housing 72, preferably cylindrical, 2) a tapped coil 122 contained within the housing, 3) a voltage probe disc 124 coupled to a first end of the tapped coil 122 and 4) coaxial cable 80 coupled to the tapped coil 122 within the housing 72 through first water-tight seal 82 and passing the RF-modulated signal 18. The coaxial cable 80 is preferably coupled to a second end of the tapped coil 122 and to an intermediate tap point 126 through high "Q" variable capacitor 92, adjusted to match the impedance of the delivery apparatus 120 to the signal generator 12. The tapped coil 122 generates magnetic field 20 that extends into the solution 16 surrounding the delivery apparatus 120. A voltage measured between points 128 and 130 is inductively generated by the tapped coil 122 and is greater in amplitude than the RF-modulated signal 18 input to the tapped coil 122. The voltage at point 128 is coupled to the voltage probe disc 124, contained within a water-tight chamber 132 at the first end of the water-tight housing 72. A non-conductive inner end plate 134 is sealed at a first inner position of the housing 72 and a non-conductive thin outer end plate 136, proximate to the first end of the housing 72, is sealed at the first end of the housing 72 to form the water-tight chamber 132. The voltage generated at the first end of the tapped coil 122 is coupled to the voltage probe disc 124 through a second water-tight seal 138. The chamber 132 is preferably filled with fluid 114, e.g., de-ionized water (DI). As with the previously described embodiment, this structure improves the coupling of the electric field 22 into the solution 16 while minimizing the electrical load. As previously described, the section of the housing 72 which forms the water-tight chamber 132 is preferably made from a non-conductive material, e.g., PVC. However, the wall section of housing 72 surrounding the tapped coil 122 can alternatively be fabricated from a non-conductive, e.g., PVC, or conductive, e.g., copper, material.

Figure 10:
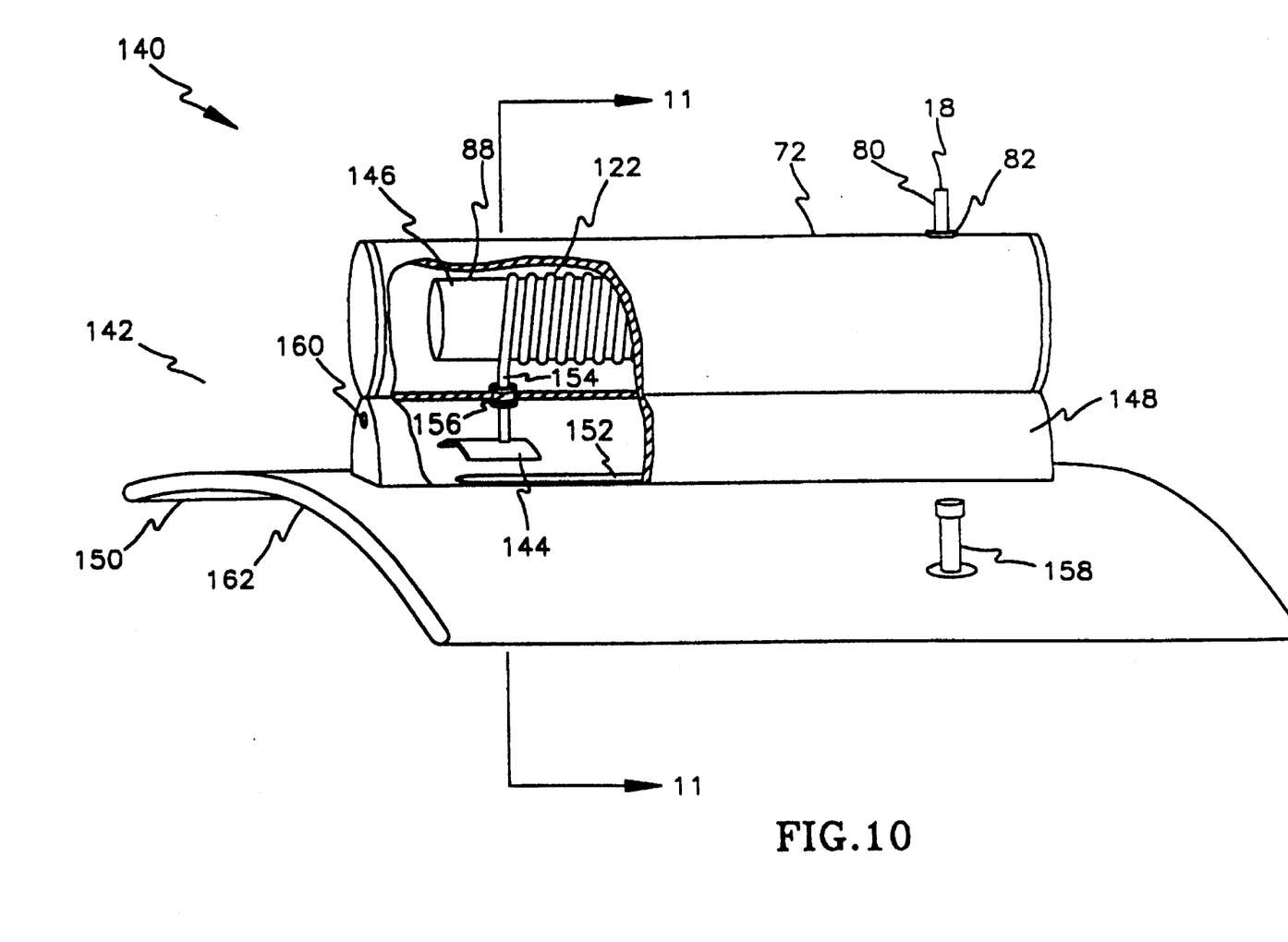
FIG. 10 is a transparent view of a third preferred embodiment of a delivery apparatus.
Figure 11:
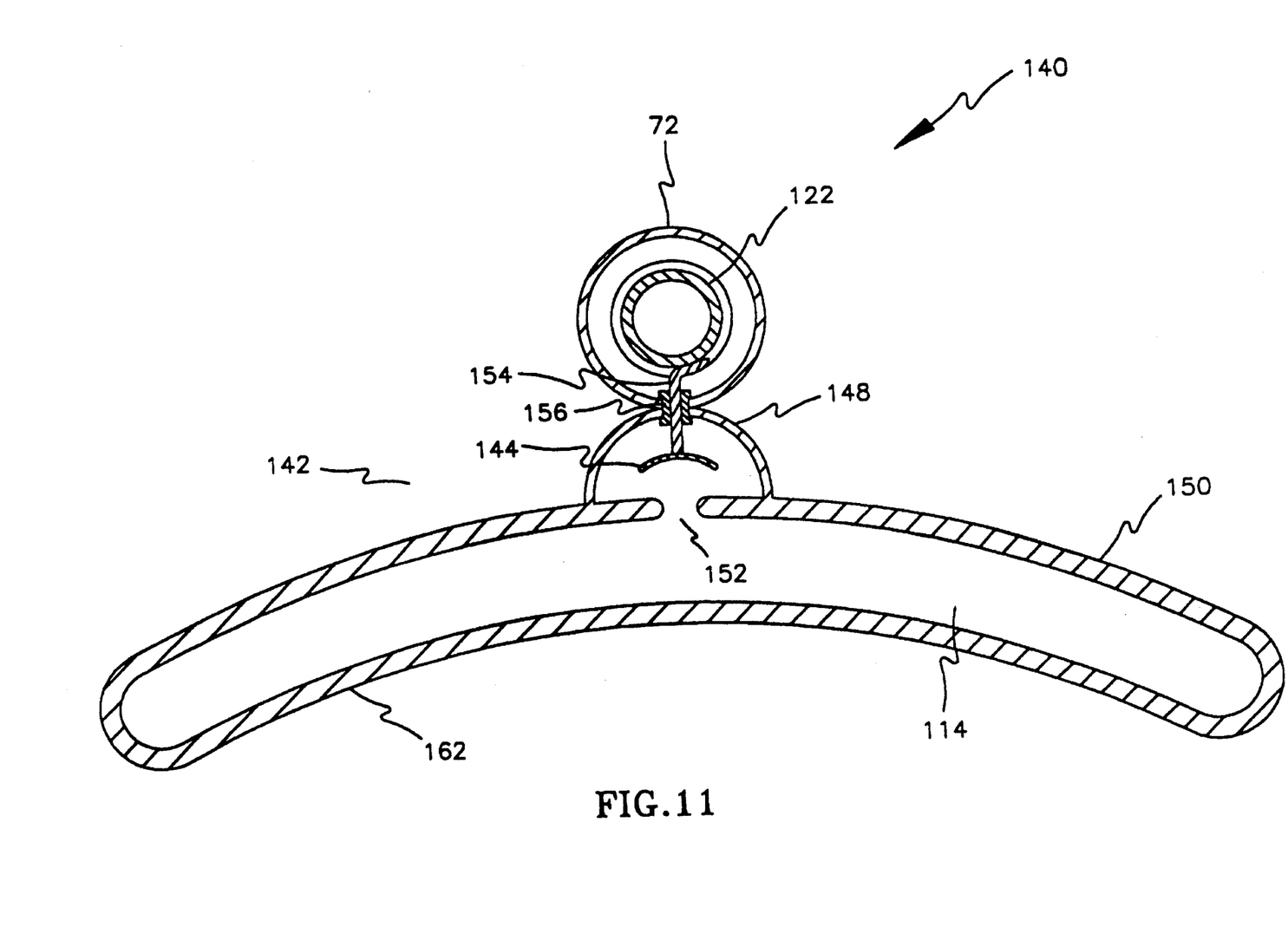
FIG. 11 is a cross sectional view of the embodiment of FIG. 10 along the plane 11—11.

FIGS. 10 and 11 show a third alternative embodiment 140 of delivery apparatus 14. The delivery apparatus 140 is primarily comprised of 1) water-tight housing 72, preferably cylindrical, 2) tapped coil 122 contained within the housing, 3) a voltage coupling structure 142 containing a voltage coupling plate 144 coupled to a first end 146 of the tapped coil 122, and 4) coaxial cable 80 coupled to the tapped coil 122 in the housing 72 through first water-tight seal 82 and passing the RF-modulated signal 18. Essentially, the structure of the water-tight housing 72 and the tapped coil 122 are identical with the previously-described embodiment 120 shown in FIG. 9A. However, in this embodiment, the additional voltage coupling structure 142 is comprised of a second housing 148 coupled to a bladder 150, preferably flexible, forming a water-tight assembly with a fluid coupling passageway 152 inbetween. The voltage coupling plate 144 is contained within the second housing 148 and is electrically coupled to the first end 146 of the tapped coil 122 using conductor 154 which passes through a second water-tight seal 156. The voltage coupling structure 142 is preferably filled with fluid 114, e.g., de-ionized water (DI), using a filler tube and cap 158. While the voltage coupling structure 142 is being filled with fluid 114, air within is vented through an exhaust port 160. The voltage coupling structure 142 and specifically the bladder 150 are preferably formed as an arcuate surface 162 to match an outer surface, e.g., a curved tank or pipe, thus facilitating treatment of the solution 16 contained within. Thus, in this embodiment, the solution 16 is treated with magnetic and electric fields, respectively 20 and 22, without the delivery apparatus 140 having contact with the solution 16. As previously described, housing 72 may alternatively be fabricated from a non-conductive, e.g., PVC, or conductive, e.g., copper, material.

Figure 12:
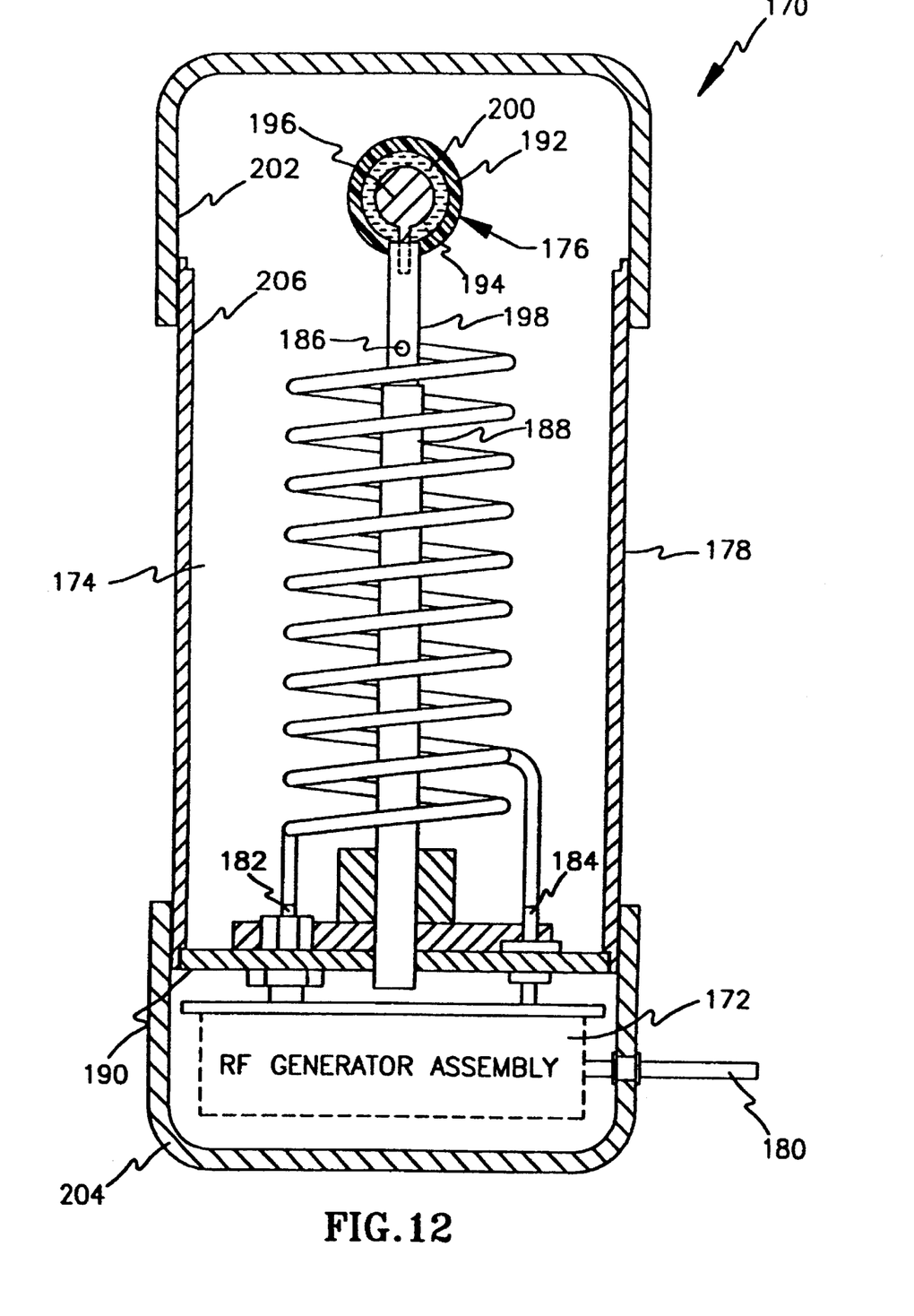
FIG. 12 is a partial cross sectional view of a fourth preferred embodiment of a delivery apparatus.

FIG. 12 shows a fourth alternative embodiment 170 of delivery apparatus 14. The delivery apparatus 170 is primarily comprised of an RF generator assembly 172, 2) a helical resonator 174, and 3) a voltage probe assembly 176, all contained within a water-tight housing 178. The RF generator assembly 172, is somewhat analogous to the previously described signal generator 12 in that it generates an RF-modulated signal. A power control cable 180 delivers modulated power, i.e., adjustable in voltage and duty cycle, to the RF generator assembly 172 to cause the RF generator assembly to deliver RF-modulated energy via conductors 182, 184 to the helical resonator 174, i.e., a tapped coil. The close proximity of the RF generator assembly 172 to the helical resonator 174 improves signal delivery. The helical resonator 174, generates a high voltage signal at its end 186 to the voltage probe assembly 176 in a similar manner to the previously described tapped coil 122. The helical resonator 174 is preferably formed of a metallic coil formed from a length of conductive wire, e.g., copper, having an unwound length of one quarter of the wavelength of the RF signal (e.g., approximately 8.62 feet @27,225 MHz). A non-conductive, e.g., polycarbonate, adjustment rod 188 is coupled to the end 186 of the helical resonator 174 and adjustably passes through end plate 190. By altering the relative position of the adjustment rod 188, the linear size of the helical resonator 174 is altered to adjust the impedance of the resonator 174 and improve signal matching to the RF generator assembly 172.

The voltage probe assembly 176 is primarily comprised of 1) a non-conductive, e.g., Teflon, outer hollow housing 192, preferably spherical, forming a matching chamber 194 within, 2) a conductive, e.g., gold-plated brass, voltage probe 196 contained within the housing 192, and a conductive standoff 198, coupled at a first end to the voltage probe 196, e.g., via a threaded coupling, and forming a water-tight seal to the housing 192. The second end of the conductive standoff 198 is coupled to end 186 of the helical resonator 174 providing a conductive path between the resonator 174 and the voltage probe 196. A fluid 200, e.g., de-ionized water (DI), surrounds the voltage probe 196 within the chamber 194.

The structure of the water-tight housing 178 is divided into three sections. In first and second sections 202, 204 surrounding the voltage probe assembly 176 and the RF generator assembly 172, the walls of the housing 178 are formed of a non-conductive material, e.g., plastic. However, the third section 206 of the housing 178 forms a shield, preferably cylindrical and fabricated from a conductive material, e.g., copper, to contain the electrical field.

Figure 13:
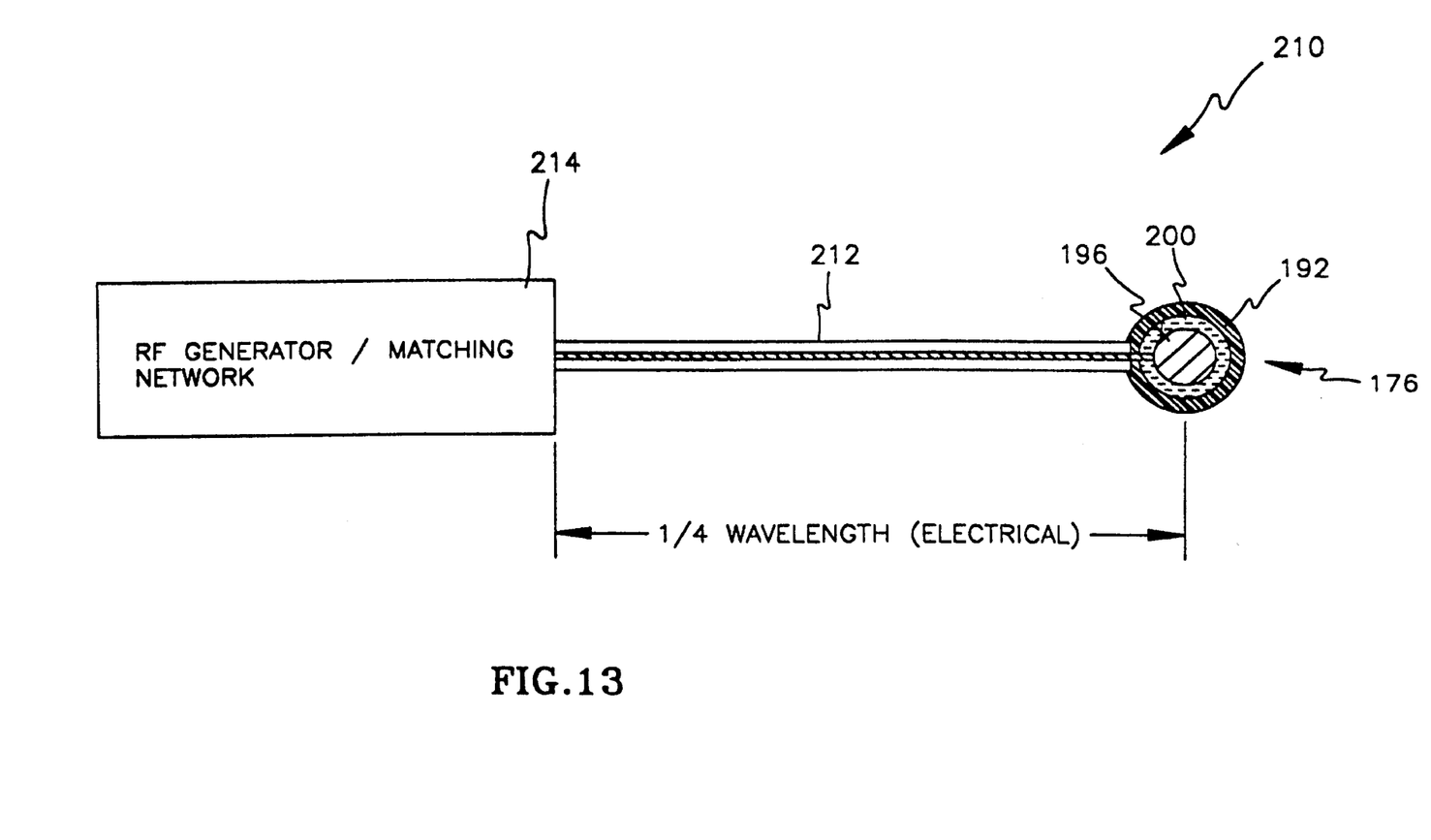
FIG. 13 is a partial cross sectional view of a fifth preferred embodiment of a delivery apparatus.

FIG. 13 shows a fifth alternative embodiment 210 of delivery apparatus 14. This embodiment is primarily comprised of the previously described voltage probe assembly 176 coupled via a shielded cable 212 having a length equal to ¼ of the wavelength of the RF signal (e.g., approximately 7.9 feet @27,225 MHz and differing from the prior embodiment due to the characteristics of the cable) to an RF generator/matching network 214, similar in function and structure to the RF generator assembly 172 but physically remote from the voltage probe assembly.

Although the present invention has been described in detail with reference only to the presently-preferred embodiments, those of ordinary skill in the art will appreciate that various modifications can be made without departing from the invention. Accordingly, the invention is defined by the following claims.

We claim:

1. Apparatus for delivering electromagnetic energy into a solution, comprising:

a first housing having closed ends defining a first water-tight chamber;

coil means contained within said first chamber; said coil means delivering a magnetic field into the solution;

voltage probe means coupled to said coil means for delivering an electric field into the solution; and means for coupling an electromagnetic signal to said coil means.

2. The apparatus of claim 1, wherein said voltage probe means is maintained within said apparatus, electrically isolated from the solution.

3. The apparatus of claim 2, wherein said voltage probe means comprises:

an inner non-conductive plate coupled to an inner surface of said first housing and defining a first end of said first chamber;

an outer non-conductive surface coupled to a first end of said first housing and defining a second water-tight chamber between said inner and outer plates and said first housing;

an electrically conductive plate contained within said second chamber for delivering an electric field into the solution;

a conductor for coupling said plate to said coil means; and sealing means for passing said conductor from said first chamber containing said coil means to said second chamber containing said plate.

4. The apparatus of claim 3, wherein said second chamber is filled with a fluid.

5. The apparatus of claim 4, wherein said fluid is de-ionized water.

6. The apparatus of claim 3, wherein said coil means is comprised of a conductive tapped coil having a first end, a second end and an inner tap; said electromagnetic signal coupled to said first end and said inner tap and said voltage probe means coupled to said second end.

7. The apparatus of claim 3, wherein said coil means is comprised of a conductive primary coil electrically coupled to said electromagnetic signal and a conductive secondary coil inductively coupled to said primary coil; said voltage probe means coupled to said secondary coil.

8. The apparatus of claim 1, wherein said coil means is comprised of a conductive primary coil electrically coupled to said electromagnetic signal and a conductive secondary coil inductively coupled to said primary coil; said voltage probe means coupled to said secondary coil.

9. The apparatus of claim 3, wherein said coil means is comprised of a conductive tapped coil having a first end, a second end and an inner tap; said electromagnetic signal coupled to said first end and said inner tap and said voltage probe means coupled to said second end.

10. The apparatus of claim 2, wherein said voltage probe means comprises:

a second water-tight housing coupled to an outer surface of said first housing; said second housing having an inner surface defining a second chamber;

an electrically conductive plate contained within said second chamber for delivering an electric field into the solution;

a conductor for coupling said plate to said coil means; and sealing means for passing said conductor from said first chamber containing said coil means to said second chamber containing said plate.

11. The apparatus of claim 10, wherein said second chamber is filled with a fluid.

12. The apparatus of claim 11, wherein said fluid is de-ionized water.

13. The apparatus of claim 11, additionally comprising a third non-conductive water-tight housing coupled to said second housing; said third housing defining a third chamber coupled to said second chamber via a common passageway.

14. The apparatus of claim 13, wherein said second and third chambers are filled with a fluid.

15. The apparatus of claim 14, wherein said fluid is de-ionized water.

16. The apparatus of claim 13, wherein said third housing has an outer arcuate surface for external coupling to a pipe, tank or other curved surface.

17. The apparatus of claim 1, where in said coil means increases the amplitude of said electromagnetic signal coupled to said voltage probe means.

18. A system for delivering electromagnetic energy into a solution, comprising:

a signal generator for generating a modulated RF signal output;

a first housing having closed ends defining a first water-tight chamber;

coil means contained within said first chamber for delivering a magnetic field into the solution;

voltage probe means coupled to said coil means for delivering an electric field into the solution; and means for coupling said modulated RF signal to said coil means.

19. The electromagnetic delivery system of claim 18, wherein said signal generator comprises:

means to set the amplitude of said RF signal; and means to set the duty cycle of said RF signal;

said amplitude and duty cycle setting means forming said modulated RF signal.

20. The electromagnetic delivery system of claim 19, wherein said amplitude and said duty cycle are set according to test data.

21. The electromagnetic delivery system of claim 20, additionally comprising sensor means for measuring electromagnetic energy in the solution; said sensor means coupled to said amplitude and duty cycle setting means to determine said amplitude and duty cycle of said RF signal.

22. Apparatus for delivering electromagnetic energy into a solution, comprising:
- a voltage probe assembly comprising:
    - a first hollow-non-conductive housing defining a first water-tight chamber;
    - a conductive probe centrally contained within said first chamber; and
    - a fluid essentially surrounding said conductive probe within said first chamber;
- means for generating an RF-modulated signal; and
- means for coupling said RF-modulated signal to said voltage probe assembly.

23. The apparatus of claim 22, additionally comprising a second housing having closed ends defining a second water-tight chamber wherein said voltage probe assembly and said RF-modulated signal generation means are contained within said second housing.

24. The apparatus of claim 23, wherein said RF-modulated signal generation means comprises:
- a helical coil having first and second ends and a central tap; and
- an RF generator coupled to said first end of said helical coil and said central tap wherein said voltage probe assembly is coupled to said second end of said helical coil.

25. The apparatus of claim 24, wherein said second water-tight chamber is essentially divided into three sections, a first non-conductive section surrounding said voltage probe assembly, a second non-conductive section essentially surrounding said RF generator; and a third conductive section essentially surrounding said helical coil.

* * * * *